W. E. KELLY.
Hog-Elevators.

No. 152,382. Patented June 23, 1874.

WITNESSES:

INVENTOR:
W. E. Kelly
BY
ATTORNEYS.

UNITED STATES PATENT OFFICE.

WILLIAM E. KELLY, OF SUSQUEHANNA TOWNSHIP, DAUPHIN COUNTY, PA.

IMPROVEMENT IN HOG-ELEVATORS.

Specification forming part of Letters Patent No. 152,382, dated June 23, 1874; application filed December 29, 1873.

*To all whom it may concern:*

Figure 1:
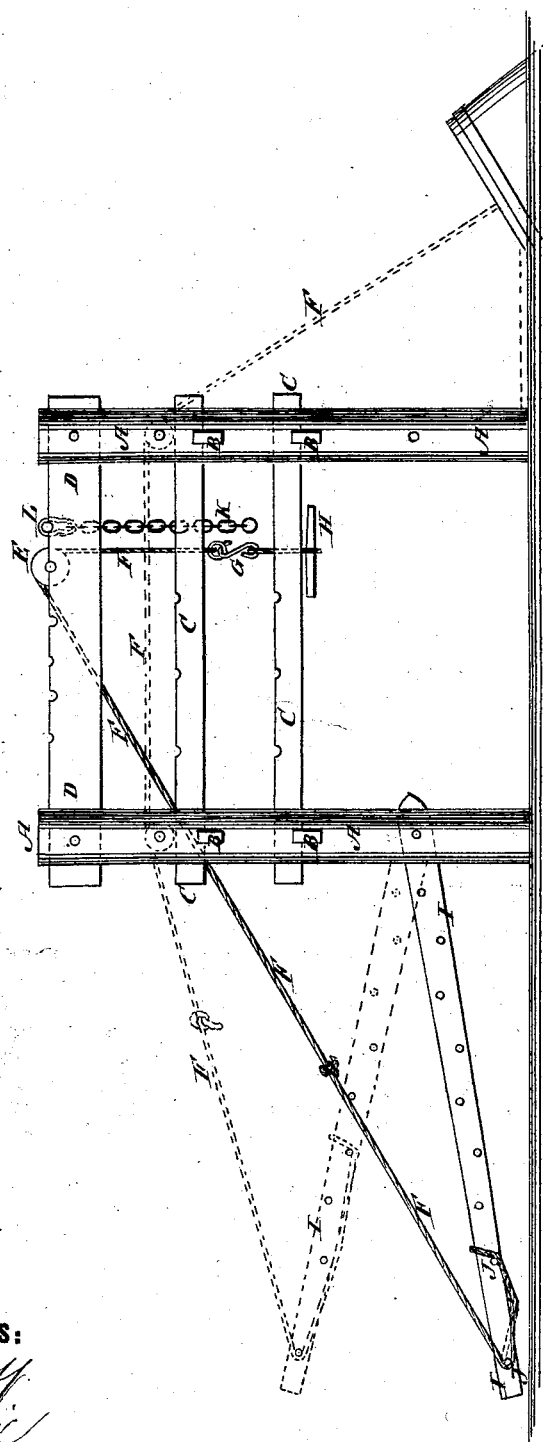
Figure 2:
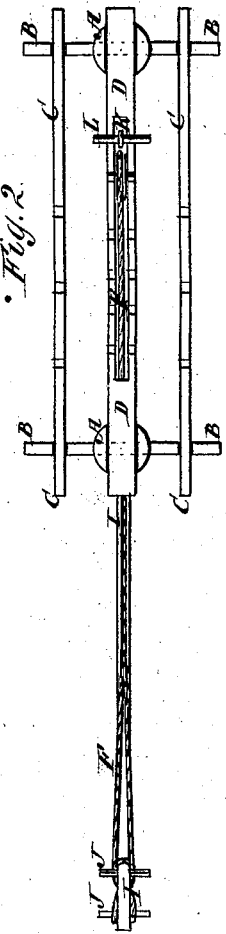

Be it known that I, WILLIAM E. KELLY, of Susquehanna township, in the county of Dauphin and State of Pennsylvania, have invented a new and useful Improvement in Hoisting and Hanging Apparatus for Outdoor Butchering, of which the following is a specification:

Figure 1 is a side view of my improved apparatus. Fig. 2 is a top view of the same.

Similar letters of reference indicate corresponding parts.

My invention has for its object to furnish an improved apparatus for outdoor butchering, for hoisting and hanging hogs, cattle, and other animals, and which shall be simple in construction, and convenient in use, enabling the work to be done with a slight exertion of power. The invention consists in the slotted posts, cross-bars, longitudinal bars, slotted beam, pulley, hoisting-rope, and pivoted bar, arranged to operate, in connection with each other, as hereinafter fully described.

A are two posts, which are set in the ground at any desired distance apart, according to the desired number of animals to be hung up at a time. B are cross-bars, which are passed through holes or mortises in the posts A at right angles to the plane of said posts. Two or more of the cross-bars B may be attached to each of the posts A, and in the upper sides of their end parts are formed notches, to receive the longitudinal bars C, a pair of which is connected with each pair of cross-bars B. The bars C are notched upon their upper edges, to receive the gambrels when suspending the carcasses. The upper ends of the posts A are connected together by a beam, D, the end parts of which are secured in notches in the said upper ends of the said posts A. The beam D is slotted longitudinally and vertically, and in its upper edge are formed notches, to receive the journals of the pulley E, around which passes a rope, F, to one end of which is secured, or in it is formed, an eye, to receive the hook G, attached to the gambrel H. The rope F passes through a slot in one of the posts, and has a loop formed upon its other end, which is passed around the bar I, and secured by two belaying-pins, J, passed through the said bar. Several holes are formed through the bar I, to receive the pins J, so that the rope F may be readily adjusted as the height to which the animal is to be raised may require. The inner end of the bar I passes into, and is pivoted in, a mortise or slot in the lower part of the post A. K is a short chain, to one end of which is attached a short cross-bar, L, which is designed to rest upon the upper edge of the beam D, close to the rear edge of the pulley E, while the chain K hangs down through the slot of the beam D. With this construction, by raising the outer end of the bar I, the end of the rope E runs down, so that its eye may be placed upon the hook G. Then, by lowering the free end of the bar I, the animal will be raised, so that the gambrel may be turned to rest upon the bars C. In case one movement of the bar I be not sufficient to raise the carcass to the desired height, a link of the chain K is passed over the hook G, so that the carcass may be supported by the said chain, while the attachment of the rope F to the bar I may be adjusted for another lift.

The apparatus may be used for scalding hogs, by sinking the scalding-barrel in the ground at one end of the apparatus, and passing the rope F over pulleys pivoted in the slots in the upper part of the posts A, as shown in dotted lines in Fig. 1, so that the hog may be lowered into or raised out of the water by operating the bar I.

Having thus described my invention, I claim as new and desire to secure by Letters Patent—

The slotted posts A, cross-bars B, longitudinal bars C, slotted beam D, pulley E, rope F, and pivoted bar I, arranged to operate, in connection with each other, substantially as herein shown and described.

WILLIAM EDWARD KELLY.

Witnesses:
PHILIP D. FELTY,
H. M. BRUBAKER.